(12) United States Patent
Jung et al.

(10) Patent No.: US 7,865,914 B2
(45) Date of Patent: Jan. 4, 2011

(54) COOPERATIVE DLL UNLOAD

(75) Inventors: Kenneth M. Jung, Seattle, WA (US);
Arun Kishan, Bellevue, WA (US); Neill M. Clift, Kirkland, WA (US); Dragos C. Sambotin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 11/693,080

(22) Filed: Mar. 29, 2007

(65) Prior Publication Data

US 2008/0243965 A1    Oct. 2, 2008

(51) Int. Cl.
*G06F 9/44*    (2006.01)
*G06F 9/46*    (2006.01)
*G06F 12/00*    (2006.01)

(52) U.S. Cl. .................. 719/331; 719/315; 719/316; 719/330; 719/332; 710/200; 710/240; 710/241; 710/242; 710/243; 710/244; 717/162; 717/163; 717/164

(58) Field of Classification Search ......... 719/315–316, 719/330–332; 710/200, 240–244; 717/162–164
See application file for complete search history.

(56) References Cited

U.S. PATENT DOCUMENTS

| | | | |
|---|---|---|---|
| 5,410,698 A | | 4/1995 | Danneels |
| 6,138,251 A | * | 10/2000 | Murphy et al. ................ 714/41 |
| 6,698,015 B1 | * | 2/2004 | Moberg et al. .............. 717/154 |
| 6,708,330 B1 | | 3/2004 | Moberg |
| 6,728,963 B1 | | 4/2004 | Forin |
| 6,842,906 B1 | | 1/2005 | Bowman-Amuah |
| 6,881,216 B2 | | 4/2005 | Di Caprio et al. |
| 6,996,832 B2 | | 2/2006 | Gunduc |
| 7,080,376 B2 | | 7/2006 | Buch |
| 7,171,674 B2 | * | 1/2007 | Arrouye et al. ............. 719/331 |
| 7,237,237 B2 | * | 6/2007 | Foti ........................... 717/158 |
| 7,581,232 B2 | * | 8/2009 | Bernabeu-Auban et al. . 719/330 |
| 2006/0059496 A1 | | 3/2006 | Joy |

OTHER PUBLICATIONS

Holgate, L. "Designing Asynchonous COM Components for VB," Apr. 11, 2002, <http://www.lenholgate.com/archives/000514.html> [retrieved Feb. 9, 2007].
Jin, K., "The iODBC Driver Manager," Nov. 11, 2004, © 1995 Ke Jin; © 1991-2002 Openlink Software <http://www.opensource.apple.com/darwinsource/Current/iodbc-28/iodbc/iodbc/connect.c> [retrieved Feb. 9, 2007].

* cited by examiner

*Primary Examiner*—Qing Wu
(74) *Attorney, Agent, or Firm*—Wolf, Greenfield & Sacks, P.C.

(57) ABSTRACT

Loading and unloading a plurality of libraries on a computing device having a loader lock and internal and external counts for each library in the plurality of libraries is disclosed. The libraries assume an initialize state, followed by an initialized state, a pending unload state, and an unload state according to when the internal and external counts are incremented and decremented. When in the pending unload state, the functions of a library that include functions that require acquiring the loader lock exit, the internal count is decremented by one, and the loader lock is released. Prior to entering the pending unload state, a library may be placed into a reloadable state. A library in the reloadable state may be reloaded upon request until a timer times out. When the timer times out, the library in the reloadable state transitions into the pending unload state.

18 Claims, 4 Drawing Sheets

COOPERATIVE DLL UNLOAD

BACKGROUND

Computing devices perform tasks by executing computing instructions. A set of computing instructions for performing a particular task form a function. A set of functions that interact for performing related tasks form an application. Two or more different applications may need to use the same function to perform the same particular task. While it is possible to include the same function's computing instructions in each of the different applications, it is more efficient for each application to use the same function. By using the same function, less memory is used to store instructions and modifications to the function need only be made in one place.

To allow more than one application to use the same functions, a library of functions, i.e., a library, is formed. Typically, a function's computing instructions and a reference to the computing instructions is placed in a library. This is done for each of the functions in a library. An application uses a function in a library, i.e., a library function, by calling the function using the reference.

Typically, libraries are loaded by a library loader software module in an operating system of a computing device. The library loader stores a reference count that is a record of how many software modules, e.g., applications and libraries, refer to a library. For example, a first application passes a request to a library loader to load a library. The library loader loads and initializes the library, passes a reference for the library to the application, and increments the reference count for the library to one. If a second application passes a request to the library loader to load the library, the library is not loaded and initialized again. Instead, the second application receives a reference for the library and the reference count for the library is incremented to two. If either of the two applications passes a request to the library loader to unload the library, the reference count is decremented. The library remains loaded until the reference count is decremented to zero at which time the library is unloaded from memory.

In general, after a library is first loaded and initialized, each subsequent load request for the library causes the library's reference count to be incremented and each unload request causes the library's reference count to be decremented. Using reference counts reduces the number of times software modules, i.e., libraries, must be loaded and unloaded. The computing resources, e.g., processor time, memory, disc access, etc., that would have been used for loading and unloading can be made available for other tasks.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Enabling a computing device having a loader lock to load and cooperatively unload a plurality of libraries is disclosed. An internal and external count for each library in the plurality of libraries is maintained. The internal count keeps track of the number of internal references to the library. The internal count is often one because the library has a reference to itself. Regardless, the internal count contains a value, e.g., one, until all other threads exit. This value prevents the library from unloading until all worker threads have completed their tasks. The external count keeps track of the number of external references to the library. Applications and libraries other than the library itself that request to load the library cause the external count to be incremented. The internal and external counts are used to determine when to load and unload the libraries. More specifically, when the external count is decremented to zero, the library is provided an opportunity to clean up the resources the library is using and drive the internal count to zero. When the internal count is decremented to zero, the library is unloaded.

A library is first placed into an initialize state during which the library is initialized. When in the initialize state, internal count of the library is set to zero and the external count of the library is incremented due to a library or application requesting that the library be loaded. When the initialization of the library is completed, the internal count is incremented, which indicates that the library has been loaded, and the state of the library changes to an initialized state. When the external count is decremented to zero, the state of the library changes to a pending unload state. When the internal count is decremented to zero, the state of the library changes to an unloadable state. When in the unloadable state, the library is unloaded.

When a library, which has worker threads that require acquiring the loader lock, is in the pending unload state, the worker threads exit, the internal count is decremented by one, and the loader lock is released.

Alternately, upon the decrementing of the external count to zero, a library is placed into a reloadable state, instead of the pending unload state, and a timer is set. Until the timer times out, a library in the reloadable state may be reloaded upon request. If the library is reloaded the, external count is incremented. When the timer times out, the library in the reloadable state is placed into the pending unload state.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
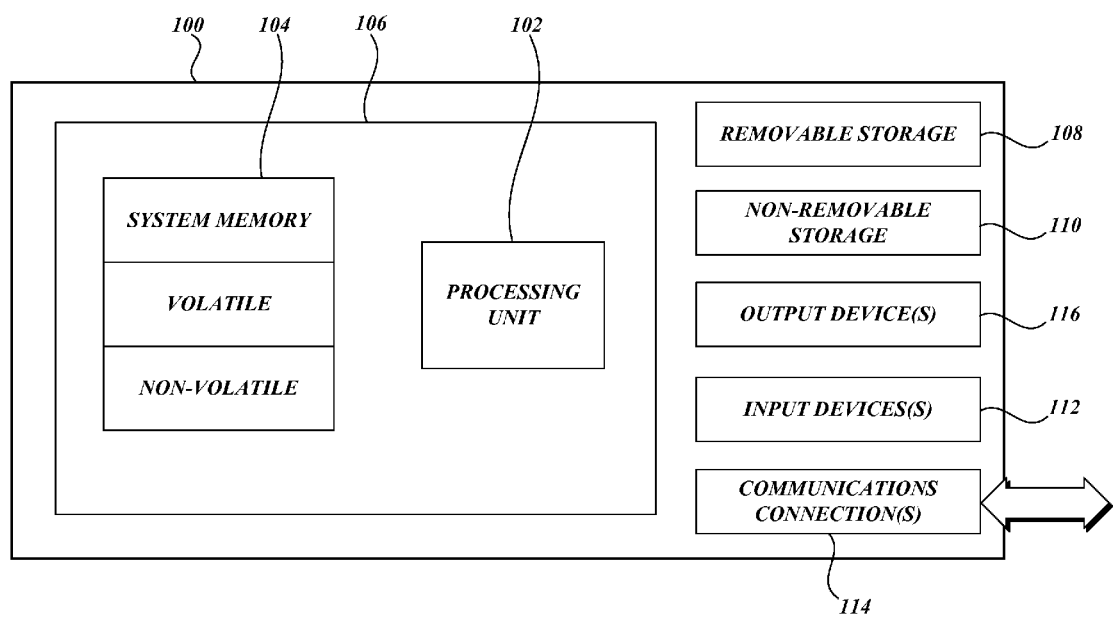
FIG. 1 is a block diagram of an exemplary computing device suitable for performing cooperative library unloading.

Libraries are ordered collections of computer software functions that enable more than one software program to use the functions. By making the same functions available to multiple software programs, less memory is used to store instructions. At least as important, if a function needs to be modified, the modification can be done in one software module, i.e., the library, instead of many software modules, i.e., the programs. A function in a library is referred to as a "library function." Typically, each library functions' computing instructions and a reference to each functions' computing instructions are placed in a library. Before a library function's computing instructions can be executed by, for example, an application, the library containing the library function must be located, loaded, and initialized. Initialization usually involves executing instructions that prepare, for example, data structures used by the library functions.

Normally, a software module in an operating system called a "library loader" provides library location, loading, and initialization. The library loader stores a reference count that is a record of how many software modules, e.g., applications and libraries, refer to a library. After a library is first loaded and initialized, each subsequent load request for the library causes the library's reference count to be incremented and each unload request causes the library's reference count to be decremented. Using reference counts reduces the number of times software modules, i.e., libraries, must be loaded and unloaded. Hence, computing resources, e.g., processor time, memory, disc access, etc., that would have been used for loading and unloading, can be made available for other tasks.

While using reference counts promotes computing resource efficiency, even when using reference counts, a library is often loaded and unloaded many times in a short span of time. For example, an application having a user interface may rely on a specialized graphics library for a certain graphic function, e.g., a graduated background function. Compared to other libraries used by an application, a specialized graphics library often require a large amount of memory. In this example, further assume that, for this particular application, the graduated background function is not expected to be called very often. Hence, to save memory, the application is written such that the application unloads the specialized graphics library after using the graduated background function. If, during the operation of the application, a user over a short span of time, e.g., tenths of seconds, repeatedly performs an action that requires the graduated background function, the specialized graphics library must be loaded and unloaded many times during a short span of time. Because the repeated loading and unloading of the specialized graphics library occupies substantial computing resources, user perceivable delays may occur and the responsiveness of the application may be reduced. Furthermore, executing initialization routines is computationally expensive. Hence, it is desirable to avoid the redundant execution of initialization routines, particularly within short time intervals.

It is desirable to increase the responsiveness of the application in the aforementioned example. Responsiveness can be increased by supporting delayed unloading, e.g., reducing the number of times the specialized graphics library is reloaded. Another way to increase responsiveness is to use cooperative unloading, a mechanism by which a library can shut itself down after being notified that the library will be unloaded.

FIG. 1 is a block diagram that illustrates an exemplary computing device 100 suitable for performing cooperative library unloading. Computing devices such as the exemplary computing device 100 include, but are not limited to, desktop computers, servers, laptop computers, handheld computing devices, embedded computing devices, etc.

The computing device 100 shown in FIG. 1 comprises a basic computing device 106 and various types of peripheral devices with which the basic computing device 106 interacts. The basic computing device 106 comprises a processing unit 102 for processing computing instructions and controlling the operation of the computing device 100 and a memory unit 104 for storing the computing instructions waiting to be immediately executed. The memory unit 104 may include system memory, volatile memory, and non-volatile memory. The processing unit 102 may be implemented as one microprocessor, a plurality of microprocessors, a multiple core microprocessor, a plurality of multiple core microprocessors, or other electronic circuitry capable of providing similar computing resources. The memory unit 104 may be implemented by memory devices such as, but not limited to, read-only memory (ROM), programmable read-only memory (PROM), electrically programmable read-only memory (EPROM), electrically erasable and programmable read-only memory (EEPROM), random-access memory (RAM), static random-access memory (SRAM), dynamic random-access memory (DRAM), flash memory or a combination of the aforementioned memory devices.

The basic computing device 106 shown in FIG. 1 may interact with one or more peripheral devices including, but not limited to, removable storage 108, non-removable storage 110, output device(s) 116, input device(s) 112, and communication connection(s) 114. Removable storage 108 devices enable the long term, portable storage of computing instructions and data and include, but are not limited to, removable magnetic disc drives and removable optical disc drives such as compact disc (CD) drives and digital video drives (DVD). Non-removable storage 110 devices enable the long term storage of computing instructions and data and include, but are not limited to, magnetic disc drives, optical disc drives, holographic storage units, and so on. Output device(s) 116 enable the computing device 100 to produce visual, audible, and other output and include, but are not limited to, liquid crystal displays (LCDs), plasma displays, cathode ray tube (CRT) displays, audio speakers, haptic gloves, haptic seats, digital projectors, and so on. Input device(s) 112 enable the computing device 100 to accept and process visual, audible, and other input and include, but are not limited to, mice, keyboards, electronic pens, microphones, digital cameras, digital video cameras, and so on. Communication connection(s) 114 include, but are not limited to, Ethernet, Token Ring, Fiber Distributed Data Interface (FDDI), Asynchronous Transfer Mode (ATM), Firewire connections, and so on.

Computing devices, such as the exemplary computing device 100 illustrated in FIG. 1 and described above, are often controlled by an operating system. An operating system controlled computing device provides an environment for cooperative library unloading. Certain operating systems provide dynamically linked libraries (DLLs). A dynamically linked library (DLL) is a library that is able to be loaded and initialized while the applications that use the DLL are running. A library tree containing nodes that represent DLLs is a DLL tree. Hence, an implementation of cooperative library unloading is cooperative DLL unloading. Except where noted, hereinafter the terms "library" and "DLL" may be interchanged and the phrases "cooperative library unload" and "cooperative DLL unload" may also be interchanged, it being understood that the disclosed subject matter is not limited to DLLs but include other types of linked libraries, including statically loaded libraries.

A library loader in an operating system loads a library into an application's process. A process is an instance of a computer program, e.g., an application, that is being executed. While a computer program is a set of computer software instructions, a process occupies memory in a computer and actually executes the instructions. It is also possible for a plurality of processes to be associated with the same computer program with each process executing independently. An exemplary process comprises: an executable computer program image; memory containing the executable code and process-specific data; operating system descriptors of resources that are allocated to the process, such as file descriptors or handles; security attributes; and processor state such as a processor's register contents, physical memory addressing, and so on.

To execute an instance of a computer program, an operating system creates a process and a thread of execution, i.e., a process thread. Hence, process threads may be considered system threads, i.e., threads created by and managed by the operating system. Threads not created and managed by the operating system are called "worker threads." When an operating system creates a process for an application, the operating system creates and starts a system thread for the process, i.e., a process thread. A process thread may create and manage worker threads. If required, the operating system's library loader loads a library, that is to be used by the application, into the application's process. Each library may in turn create its own private set of worker threads. As described above, a library loader in an operating system keeps track of references to libraries, which are loaded into processes, by using reference counts.

In an exemplary implementation of cooperative library unloading, when loading a library, the operating system calls the LoadLibrary function of the library loader using a library identifier, e.g., a library name, as a parameter value. Each library contains a LibraryMain function. The LibraryMain function in a library accepts other parameters including a parameter that specifies the next loading state of the library, i.e., the loading state parameter. Exemplary values of the loading state parameter are LIBRARY_PROCESS_ATTACH, LIBRARY_THREAD_ATTACH, LIBRARY_PROCESS_DETACH, and LIBRARY_THREAD_DETACH. The value LIBRARY_PROCESS_ATTACH indicates that the library should enter the ProcessAttach state. Similarly, LIBRARY_THREAD_ATTACH, LIBRARY_PROCESS_DETACH, and LIBRARY_THREAD_DETACH indicate that the library should enter, respectively, the ThreadAttach, ProcessDetach, and ThreadDetach states. States with other names may encompass the characteristics provided by the aforementioned states. Hence, the names of the states and the loading state parameter values should be construed as exemplary and not limiting.

Figure 2:
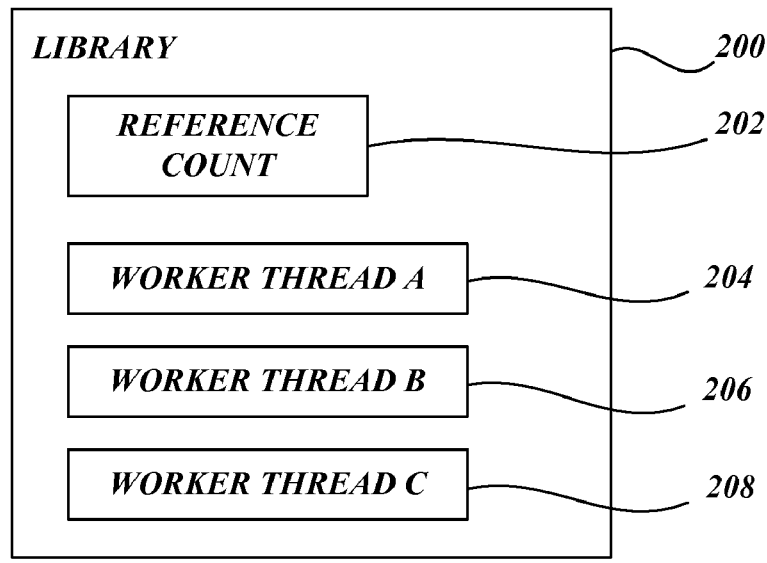
FIG. 2 is a pictorial diagram of an exemplary library containing an exemplary reference count and exemplary worker threads.

FIG. 2 is a pictorial diagram of the record of an exemplary library record 200 that contains an exemplary reference count and exemplary worker threads, i.e., references to worker threads. More specifically, library record 200 shown in FIG. 2 contains a reference count 202 and worker thread A 204, worker thread B 206, and worker thread C 208. When a library, such as the library for library record 200 shown in FIG. 2, is loaded into a process the library receives a LibraryMain call from the library loader containing a LIBRARY_PROCESS_ATTACH parameter value. When the LIBRARY_PROCESS_ATTACH parameter value is received by LibraryMain function, the library executes the LibraryProcessAttach function. A library record, such as library record 200, shown in FIG. 2, is maintained by the library loader. After the library is loaded into a process, each subsequent load call for the library, e.g., a call to load the library by another module in the process, increments the reference count 202 in the library's record, e.g., library record 200. The library is initialized and remains in the process until the reference count is decremented to zero. At that point, the library loader calls the LibraryMain function of the library with the LIBRARY_PROCESS_DETACH parameter value.

When the library loader calls the LibraryMain function with one of the four parameter values described above, e.g., the LIBRARY_PROCESS_ATTACH parameter value, the operating system first acquires the library loader's "loader lock." A lock is a synchronization mechanism for controlling access to a resource. An exemplary lock is implemented using a memory cell that can be tested and set. A function can test if the lock is free, and if free, acquire the lock in a single atomic operation. If not, a thread is put to sleep (or must spin) waiting for the lock to be released.

The library loader uses the loader lock to ensure that functions that modify the contents of the library loader's data structures, e.g., library records, do so serially, i.e., one at a time. Functions that modify the contents of the library loader's data structures must acquire the loader lock before performing an operation. While an operation is being performed, e.g., loading a library, the loader lock is unavailable. Thus, another function, such as another call to the LibraryMain function, cannot acquire the lock. In effect, this means that libraries are loaded, and unloaded, serially. Unloading a library also modifies the contents of the library loader's data structures, e.g., library records. Hence, while an unload operation is being performed, the loader lock is also unavailable and, as in a loading operation, another call to the LibraryMain function, cannot acquire the lock.

Before a library can be unloaded, the library must be "torn down," i.e., the memory and resources the library uses must be released. If a library is not completely torn down, memory and/or resources may be left in an indefinite state or remain unreachable and hence unavailable for further use. The loader lock is used to prevent reloading a library that is not completely torn down. While using the loader lock ensures that loading and unloading libraries is done safely, using the loader lock prevents library functions from safely using worker threads.

In the loading and unloading scenario described above, if a library function creates a worker thread, there is no safe way for the library function to terminate the worker thread without risking creating a deadlock. This is because, in order to exit, a thread must call the ExitThread function. The ExitThread function must acquire the loader lock in order to be able to call the LibraryMain function with the LIBRARY_THREAD_DETACH loading state parameter value. There is a deadlock because the library holds the loader lock and is waiting for the thread to exit but the thread cannot exit because the thread is unable to acquire the loader lock.

One traditional solution for avoiding such a deadlock is to have the library force a thread to terminate whether the thread has completed or not. While forcing a thread to terminate is effective at avoiding deadlocks, it is likely to leave resources open, e.g., leave a file open. A better solution for avoiding deadlocks is to use cooperative library unloading.

Figure 3:
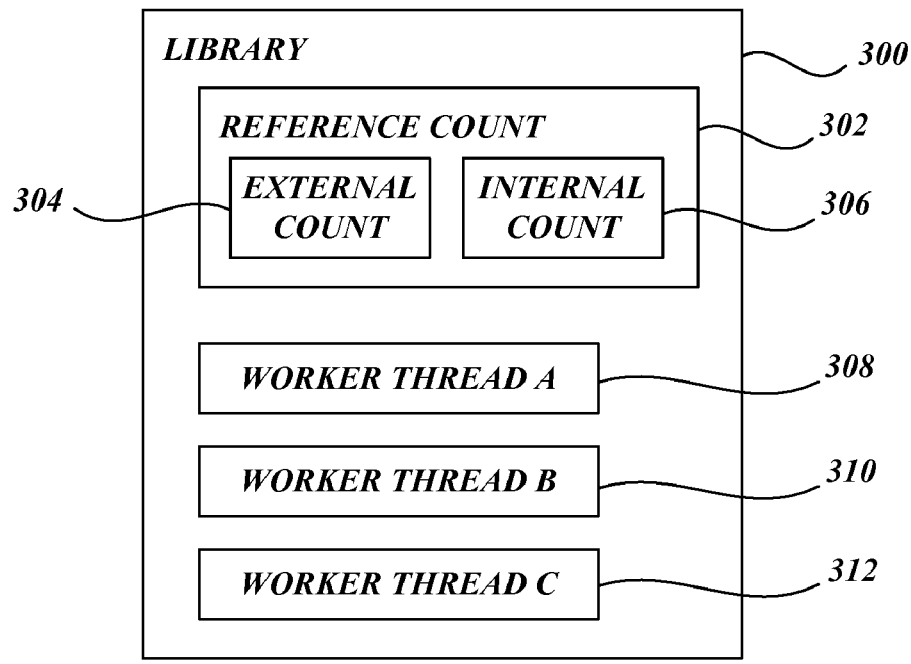
FIG. 3 is a pictorial diagram of exemplary libraries similar to the exemplary library shown in FIG. 2 having a reference count containing an external and internal count.

In an exemplary implementation of cooperative library unloading the reference count, e.g., the reference count 202, is divided into an internal and an external reference count. FIG. 3 is a block diagram of an exemplary library record 300 similar to the exemplary library record 200 shown in FIG. 2 except that the reference count 302 has been divided into an external count 304 and an internal count 306. The library record 300 also contains, i.e., contains references to, a worker thread A 308, a worker thread B 310, and a worker thread C 312. The external count 304 and the internal count 306 are incremented individually. For example, the library record 300 may have an internal count 306 equal to one and an external count 304 equal to two. The external count 304 of two indicates that two external software modules refer to the library record 300. The internal count 306 of one indicates that the library for library record 300 is loaded. If another external software module requests that the library be loaded, the external count 304 would be incremented to three, while the internal count 306 remains equal to one.

In summary, the external count 304 is incremented each time there is a request to load the library for library record 300. The external count 304 is decremented each time there is a request to unload the library for library record 300. The internal count 306 is equal to one to indicate that the library for library record 300 is loaded. A caller must hold the loader lock in order to decrement the internal count 306.

In addition to the four exemplary loading state parameter values described above, a LIBRARY_PENDING_DETACH loading state parameter value is provided by the herein described cooperative library unload process. When the external count 304 is decremented to zero, the LibraryMain function is called with a loading state parameter value LIBRARY_PENDING_DETACH instead of the LIBRARY_PROCESS_DETACH loading state parameter value. As described more fully below, the loading state invoked by the LIBRARY_PENDING_DETACH loading state parameter value provides an opportunity for the library's LibraryMain function to notify any worker threads controlled by the LibraryMain function to complete without synchronizing with the threads. The library notifies the LibraryMain function's worker threads to complete. Each worker thread is written as a loop. At the top of the loop, a check, e.g., a check of the value of a flag set during LIBRARY_PENDING_DETACH is performed to determine if the worker thread should exit. If the LibraryMain function sets the flag to indicate that a worker thread should exit, when the worker thread checks the flag, the worker thread executes computer instructions to prepare for exiting. After preparing to exit, e.g., cleaning up data structures and releasing resources, the worker thread calls the ExitThread function. The worker thread acquires the loader lock which enables the worker thread to decrement the internal count 306. The worker thread then exits and releases the loader lock. Typically this function will be provided by an operating system routine that will both decrement the reference count and issue ExitThread without returning to the callee. A return into the library can result in an access violation because the dereference may trigger the library to be unloaded.

If there is more than one worker thread, the next worker thread acquires the loader lock and repeats the exit process described above. When the internal count 306 is decremented to zero, this indicates that all of the worker threads have exited and, hence, the library may be unloaded. For libraries that don't use internal counts, e.g., traditional libraries, the internal count is never incremented and so is always zero when the external count, i.e., reference count 202, is decremented to zero. The library is unloaded and can call the LibraryMain function with the loading state parameter value LIBRARY_PROCESS_DETACH.

Figure 4:
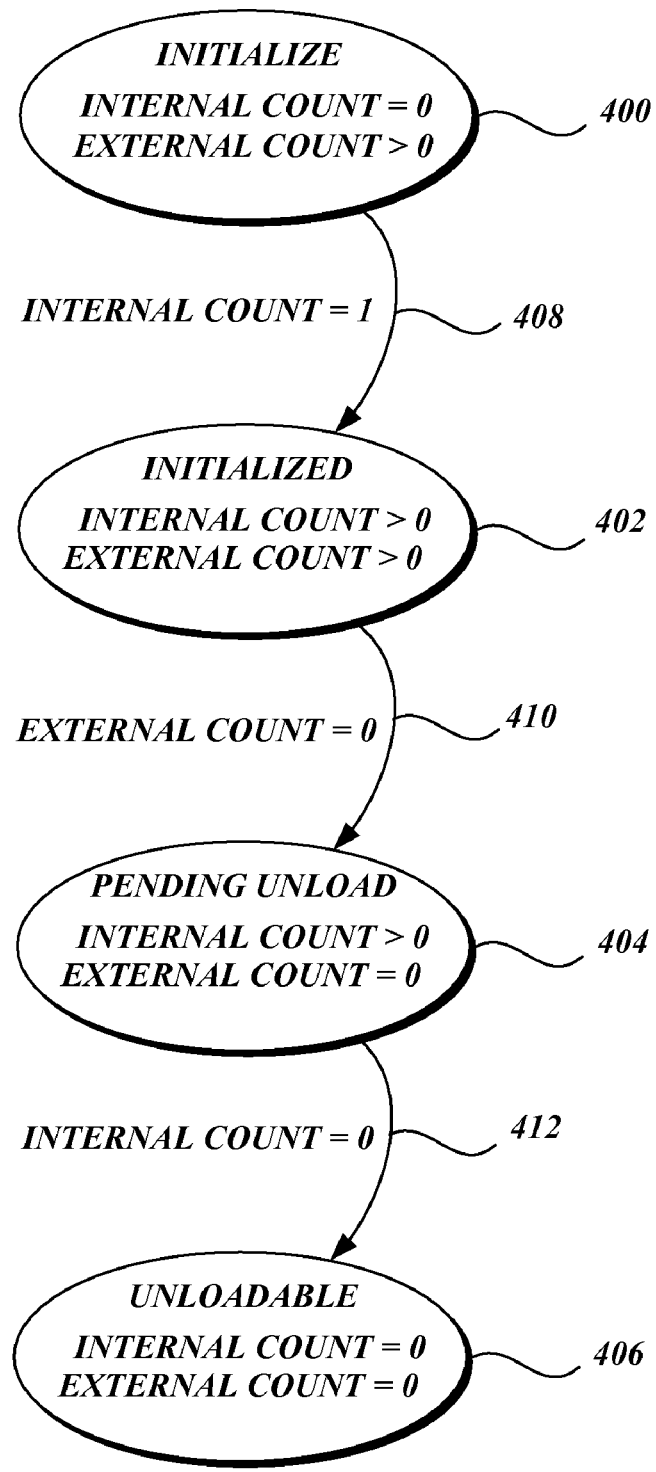
FIG. 4 is a state diagram of an exemplary cooperative library unload method.

An exemplary cooperative library unloading process, i.e., cooperative library unloading procedure, is illustrated by the exemplary state diagram shown in FIG. 4. The first state of a library in the exemplary state diagram shown in FIG. 4 is an initialize state 400. In the initialize state 400, the internal count, e.g., internal count 306, is equal to zero and the external count, e.g., external count 304, is greater than zero due to a library or application requesting the loading of the library. When the library is initialized, the internal count is incremented to one, to account for the library's reference to itself, and a state transition 408 is made to an initialized state 402. In the initialized state 402, the internal count is greater than zero and the external count is greater than zero. The cooperative unload process remains in the initialized state regardless of how many times the external count is incremented as additional libraries and applications request that the library be loaded. Likewise, the cooperative unload process remains in the initialized state as libraries and applications request that the library be unloaded and the external count is decremented. A state change occurs when the external count is decremented. More specifically, when the external count is decremented to zero, a state transition 410 is made to a pending unload state 404. In the pending unload state 404, the internal count is greater than zero, e.g., one, and the external count is equal to zero. When the internal count is decremented to zero, a state transition 412 is made from the pending unload state 404 to an unloadable state 406. As described above, the internal count decrements to zero when the final worker thread calls the ExitThread function and acquires the loader lock. In the unloadable state 406, the internal count is equal to zero and the external count is equal to zero. The unloadable state 406 is the final state. When in the unloadable state 406, the library is unloaded.

Figure 5:
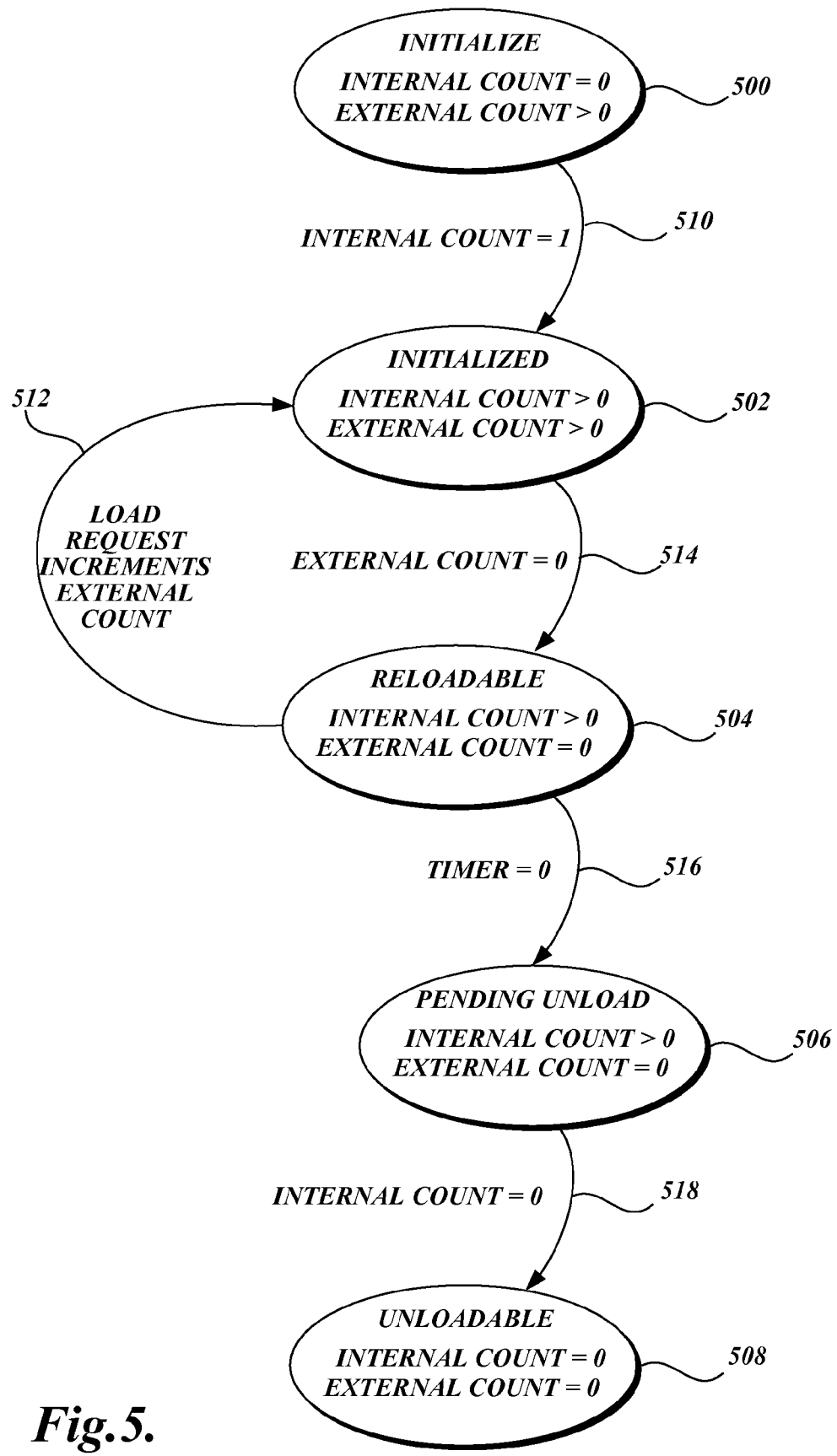
FIG. 5 is a state diagram of an exemplary cooperative library unload method including a reloadable state.

Another exemplary cooperative library unloading process, i.e., cooperative library unloading procedure, is illustrated by the state diagram shown in FIG. 5. The first library state of the state diagram shown in FIG. 5 is an initialize state 500. In the initialize state 500, the internal count, e.g., internal count 306, is equal to zero and the external count, e.g., external count 304, is greater than zero due to a library or application requesting the loading of the library. When the library is initialized, the internal count is incremented to one, to account for the library's reference to itself, and a state transition 510 is made to an initialized state 502. In the initialized state 502, the internal count is greater than zero and the external count is greater than zero. As with the FIG. 4 state diagram, the cooperative library unloading process depicted by the state diagram shown in FIG. 5 remains in the initialized state regardless of how many times the external count is incremented and decremented as libraries and applications request that the library be loaded and unloaded, until the external count is decremented to zero. When the external count is decremented to zero, a state transition 514 is made to a reloadable state 504 and a timer is set.

While in the reloadable state 504, a library may be reloaded. In the reloadable state 504, the internal count is greater than zero and the external count is equal to zero. If a load request is received, the load request causes the external count to be incremented and a state transition 512 is made back to the initialized state 502. Alternatively, if, while in the reloadable state 504, the timer runs down, e.g., is decremented to zero, a transition 516 is made to a pending unload state 506. An exemplary implementation of cooperative library unloading may block a new load request for the library in the pending unload state until the library is completely unloaded. Alternatively, the loading of the library may proceed at a different address. In most situations, blocking is preferable in order to avoid the costs of having multiple instances loaded. In the state pending unload 506, the internal count is greater than zero and the external count is equal to zero. When the internal count is decremented to zero a state transition 518 is made from the pending unload state 506 to an unloadable state 508. In the unloadable state 508, the internal count is equal to zero and the external count is equal to zero. The unloadable state 508 is the final state. When in the state unloadable 508, the library is unloaded.

An advantage of the exemplary cooperative library unloading method shown in FIG. 5 compared to the exemplary cooperative library unloading method shown in FIG. 4 is that the reloadable state, i.e., state reloadable 504, allows libraries that are waiting to be unloaded and not torn down to be reloaded for a predetermined period of time.

While illustrative embodiments have been illustrated and described, it will be appreciated that various changes can be made therein without departing from the spirit and scope of the invention.

The invention claimed is:

1. A method for enabling a computing device having a loader lock to load and unload a plurality of libraries, the method comprising:
   maintaining an internal count and external count for libraries of the plurality of libraries; and
   using the internal and external counts to determine when to load and unload the libraries of the plurality of libraries, wherein using the internal and external counts to determine when to load and unload the libraries of the plurality of libraries comprises:
      when a library is called, placing the library into an initialize state in which the internal count of the library is set to zero and the external count of the library is set to greater than zero;
      when the library is initialized, incrementing the internal count;
      when the internal count in incremented, placing the library in an initialized state;
      when the external count is decremented to zero, placing the library in a pending unload state;
      when the internal count is decremented to zero, placing the library in an unload state; and
      unloading the library when the library is in the unload state.

2. The method of claim 1, wherein the libraries include functions that require acquiring the loader lock.

3. The method of claim 2, wherein the functions that require acquiring the loader lock upon exiting cause the internal count to be decremented and release the loader lock.

4. The method of claim 1, wherein when the external count is decremented to zero, prior to placing the library in the pending unload state, placing the library in a reloadable state.

5. The method of claim 4, wherein when the library is placed in the reloadable state, a timer is set.

6. The method of claim 5, wherein when the timer times out, the library in the reloadable state is placed in the pending unload state.

7. The method of claim 6, wherein while the library is in the reloadable state, the library is available to be reloaded.

8. The method of claim 5, wherein while the library is in the reloadable state, the library is available to be reloaded.

9. The method of claim 4, wherein while the library is in the reloadable state, the library is available to be reloaded.

10. A computer memory device containing computer executable instructions that, when executed, enable a computing device having a loader lock to load and unload a plurality of libraries, the computer executable instructions including instructions for:
    maintaining an internal count and external count for libraries of the plurality of libraries; and
    using the internal and external counts to determine when to load and unload the libraries of the plurality of libraries, wherein using the internal and external counts to determine when to load and unload the libraries of the plurality of libraries comprises:
       when a library is called, placing the library into an initialize state in which the internal count of the library is set to zero and the external count of the library is set to greater than zero;
       when the library is initialized, incrementing the internal count;
       when the internal count in incremented, placing the library in an initialized state;
       when the external count is decremented to zero, placing the library in a pending unload state;
       when the internal count is decremented to zero, placing the library in an unload state; and
       unloading the library when the library is in the unload state.

11. The computer memory device containing computer executable instructions as claimed in claim 10, wherein the libraries include functions that require acquiring the loader lock.

12. The computer memory device containing computer executable instructions as claimed in claim 11, wherein the functions that require acquiring the loader lock upon exiting cause the internal count to be decremented and release the loader lock.

13. The computer memory device containing computer executable instructions as claimed in claim 10, wherein when the external count is decremented to zero, prior to placing the library in the pending unload state, placing the library in a reloadable state.

14. The computer memory device containing computer executable instructions as claimed in claim 13, wherein when the library is placed in the reloadable state, a timer is set.

15. The computer memory device containing computer executable instructions as claimed in claim 14, wherein when the timer times out, the library in the reloadable state is placed in the pending unload state.

16. The computer memory device containing computer executable instructions as claimed in claim 15, wherein while the library is in the reloadable state, the library is available to be reloaded.

17. The computer memory device containing computer executable instructions as claimed in claim 14, wherein while the library is in the reloadable state, the library is available to be reloaded.

18. The computer memory device containing computer executable instructions as claimed in claim 13, wherein while the library is in the reloadable state, the library is available to be reloaded.

* * * * *